(12) United States Patent
Rho et al.

(10) Patent No.: US 7,411,644 B2
(45) Date of Patent: Aug. 12, 2008

(54) LIQUID CRYSTAL DISPLAY PANEL AND LIQUID CRYSTAL DISPLAY APPARATUS HAVING THE SAME

(75) Inventors: Soon-Joon Rho, Suwon-si (KR); Hong-Koo Baik, Seoul (KR)

(73) Assignee: Samsung Electronics Co., Ltd. (KR)

( * ) Notice: Subject to any disclaimer, the term of this patent is extended or adjusted under 35 U.S.C. 154(b) by 464 days.

(21) Appl. No.: 11/199,673

(22) Filed: Aug. 9, 2005

(65) Prior Publication Data
US 2006/0038947 A1    Feb. 23, 2006

(30) Foreign Application Priority Data
Aug. 20, 2004    (KR) ............... 10-2004-0065685

(51) Int. Cl.
*G02F 1/1337* (2006.01)
(52) U.S. Cl. .................. 349/123; 349/129; 349/130
(58) Field of Classification Search .............. 349/123, 349/129–130; 428/1.2
See application file for complete search history.

(56) References Cited

U.S. PATENT DOCUMENTS 6,485,614 B2 * 11/2002 Katoh et al. ........... 204/157.15
6,654,089 B2 * 11/2003 Chaudhari et al. .......... 349/124

* cited by examiner

*Primary Examiner*—James A Dudek
(74) *Attorney, Agent, or Firm*—F. Chau & Associates, LLC

(57) ABSTRACT

A liquid crystal display panel includes a first substrate, a second substrate opposite the first substrate and a liquid crystal layer. The first substrate includes a lower substrate, a first buffer layer formed on the lower substrate and a first alignment layer formed on the first buffer layer. The first buffer layer includes a polymer-like carbon and the first alignment layer includes a diamond-like carbon thin film containing fluorine. The second substrate includes an upper substrate, a second buffer layer formed on the upper substrate and a second alignment layer formed on the second buffer layer. The second buffer layer includes the polymer-like carbon thin film and the second alignment layer includes the diamond-like carbon thin film containing fluorine. The liquid crystal display panel has improved light transmittance and a low probability of separation between the alignment layer and the substrate.

21 Claims, 6 Drawing Sheets

LIQUID CRYSTAL DISPLAY PANEL AND LIQUID CRYSTAL DISPLAY APPARATUS HAVING THE SAME

CROSS-REFERENCE TO RELATED APPLICATION

This application claims priority to Korean Patent Application No. 2004-65685 filed on Aug. 20, 2004, the contents of which are incorporated herein by reference in their entirety.

BACKGROUND OF THE INVENTION

1. Technical Field

The present disclosure relates to a liquid crystal display panel and a liquid crystal display apparatus having the liquid crystal display panel. More particularly, the present disclosure relates to a liquid crystal display panel including an inorganic vertical alignment (VA) layer with improved adhering properties and a liquid crystal display apparatus having the liquid crystal display panel.

2. Discussion of the Related Art

In general, a liquid crystal display (LCD) apparatus includes a liquid crystal layer. The liquid crystal layer includes liquid crystal molecules having an anisotropic permittivity, and the liquid crystal molecules are injected between substrates to form the liquid crystal layer. When an electric field is applied to the liquid crystal layer, an amount of a light transmitted through the substrates is controlled by adjusting an intensity of the electric field, so that the liquid crystal display apparatus displays an image.

The liquid crystal molecules in the liquid crystal layer are aligned in a predetermined direction at an initial state. However, an alignment direction of the liquid crystal molecules is changed when the electric field is applied to the liquid crystal layer to change the amount of the light transmitted through the liquid crystal layer.

In order to align the liquid crystal molecules, an alignment recess is formed on an alignment layer by using a roller with cloth such as velvet after a resin, for example, polyimide-based resin, is coated on the substrate in a slice thickness so as to form the alignment layer. The above-described process is referred to as a "rubbing process" in that the alignment recess is formed on the alignment layer by rubbing the substrate using the roller with cloth.

The rubbing process generates a considerable amount of particles on the alignment layer to contaminate the alignment layer when rubbing the alignment layer, so that an additional cleaning process for cleaning the particles from the alignment layer is required. In addition, the rubbing process is performed through friction between the alignment layer and a rubbing cloth of the roller so as to form the rubbing recess on the alignment layer, so that static electricity is generated on a surface of the alignment layer. Therefore, when the alignment layer is excessively rubbed, a large amount of static electricity is generated on the surface of the alignment layer, so that a thin film transistor disposed beneath the alignment layer is damaged.

Large display apparatuses having a size larger than forty inches have become popular. Considering the above trend in the display industry, the rubbing process is difficult to be employed in manufacturing a large scale display panel because of non-uniformity of the alignment and a generation of static electricity resulting from the friction on the alignment layer.

Attempts have been made to develop a non-contact process such as a photo-alignment method capable of replacing a contact-type alignment method.

As the liquid crystal display panel is scaled up, issues related to characteristics such as viewing angle, an afterimage, and response speed arise. The issues related to the viewing angle may be overcome using a patterned vertical alignment (PVA) type alignment layer. An afterimage can be generated because the alignment layer absorbs impurity ions at the surface of the alignment layer. Also, the response speed of the liquid crystal molecules in the electric field is improved by forming a pretilt angle to the liquid crystal molecules when initially aligning the liquid crystal molecules.

Particularly, the PVA type alignment process essentially requires a vertical alignment (VA) layer. A method of forming the alignment layer can be classified into a parallel alignment type such as a twisted nematic (TN) type and an in-plane switch (IPS) type, etc., and a vertical alignment type such as a vertical alignment (VA) type and a patterned vertical alignment (PVA) type, etc.

A non-contact type process for an inorganic alignment layer for a vertical alignment has not been developed. The inorganic alignment layer generally has a low adhering characteristic, so that an additional adhering member may be used between the substrate and the alignment layer. However, the adhering member is an additional member, so that when light transmittance of the adhering member is low, brightness of the liquid crystal display apparatus is also lowered. Hence, the adhering member requires enhanced light transmittance.

In the large-sized liquid crystal display apparatus, although the non-contact type inorganic alignment layer is used, the non-contact type inorganic alignment layer is easily separated from the substrate, so that the non-contact type inorganic alignment layer has a low stability.

Therefore, an adhering member is required to improve the stability of the alignment layer. Further, the adhering member is an additional layer, so that the adhering member enhancing the adhering property requires sufficient light transmittance capability to prevent the deterioration of brightness of the liquid crystal display apparatus.

SUMMARY OF THE INVENTION

Embodiments of the present invention provide a liquid crystal display panel having a non-contact type vertical alignment layer capable of preventing a deterioration of light transmittance.

Embodiments of the present invention also provide a liquid crystal display apparatus including the above liquid crystal display panel.

In accordance with an embodiment of the present invention, there is provided a liquid crystal display panel including a first substrate, a second substrate and a liquid crystal layer. The first substrate includes a lower substrate, a first buffer layer formed on the lower substrate, and a first alignment layer formed on the first buffer layer. The first buffer layer includes a polymer-like carbon (PLC) thin film, and the first alignment layer includes a diamond-like carbon (DLC) thin film containing fluorine. The second substrate is positioned opposite the first substrate corresponding to the first substrate. The second substrate includes an upper substrate, a second buffer layer formed on the upper substrate and a second alignment layer formed on the second buffer layer. The second buffer layer includes the polymer-like carbon (PLC) thin film. The second alignment layer includes the diamond-like carbon (DLC) thin film containing fluorine. The liquid crystal layer is disposed between the first and second substrates, and the liquid crystal layer comprises liquid crystal molecules having a pretilt angle that is formed between a longitudinal axis of the liquid crystal molecule and a vertical direction substantially perpendicular to each of the first and second alignment layers.

In accordance with another embodiment of the present invention, there is provided a liquid crystal display apparatus including a first substrate, a second substrate, a liquid crystal layer and a back light assembly. The first substrate includes a lower substrate, a first buffer layer formed on the lower substrate, and a first alignment layer formed on the first buffer layer. The first buffer layer includes a polymer-like carbon (PLC) thin film, and the first alignment layer includes a diamond-like carbon (DLC) thin film containing fluorine. The second substrate, corresponding to the first substrate, is positioned opposite the first substrate. The second substrate includes an upper substrate, a second buffer layer formed on the upper substrate and a second alignment layer formed on the second buffer layer. The second buffer layer includes the polymer-like carbon (PLC) thin film. The second alignment layer includes the diamond-like carbon (DLC) thin film containing fluorine. The liquid crystal layer is disposed between the first and second substrates, and the liquid crystal layer comprises liquid crystal molecules having a pretilt angle that is formed between a longitudinal axis of the liquid crystal molecule and a vertical direction substantially perpendicular to each of the first and second alignment layers. The back light assembly provides the liquid crystal layer with light.

The alignment layer includes the diamond-like carbon thin film containing fluorine. Therefore, the alignment layer may vertically align the liquid crystal molecule by a chemical property of the alignment layer without relying on an additional process. Further, the buffer layer prevents the alignment layer from separation of the alignment layer, and has an excellent light transmittance.

BRIEF DESCRIPTION OF THE DRAWINGS

Preferred embodiments of the present invention can be understood in more detail from the following descriptions taken in conjunction with the accompanying drawings in which.

DETAILED DESCRIPTION OF THE PREFERRED EMBODIMENTS

Preferred embodiments of the present invention are described more fully hereinafter with reference to the accompanying drawings. This invention may, however, be embodied in many different forms and should not be construed as limited to the embodiments set forth herein.

Figure 1:
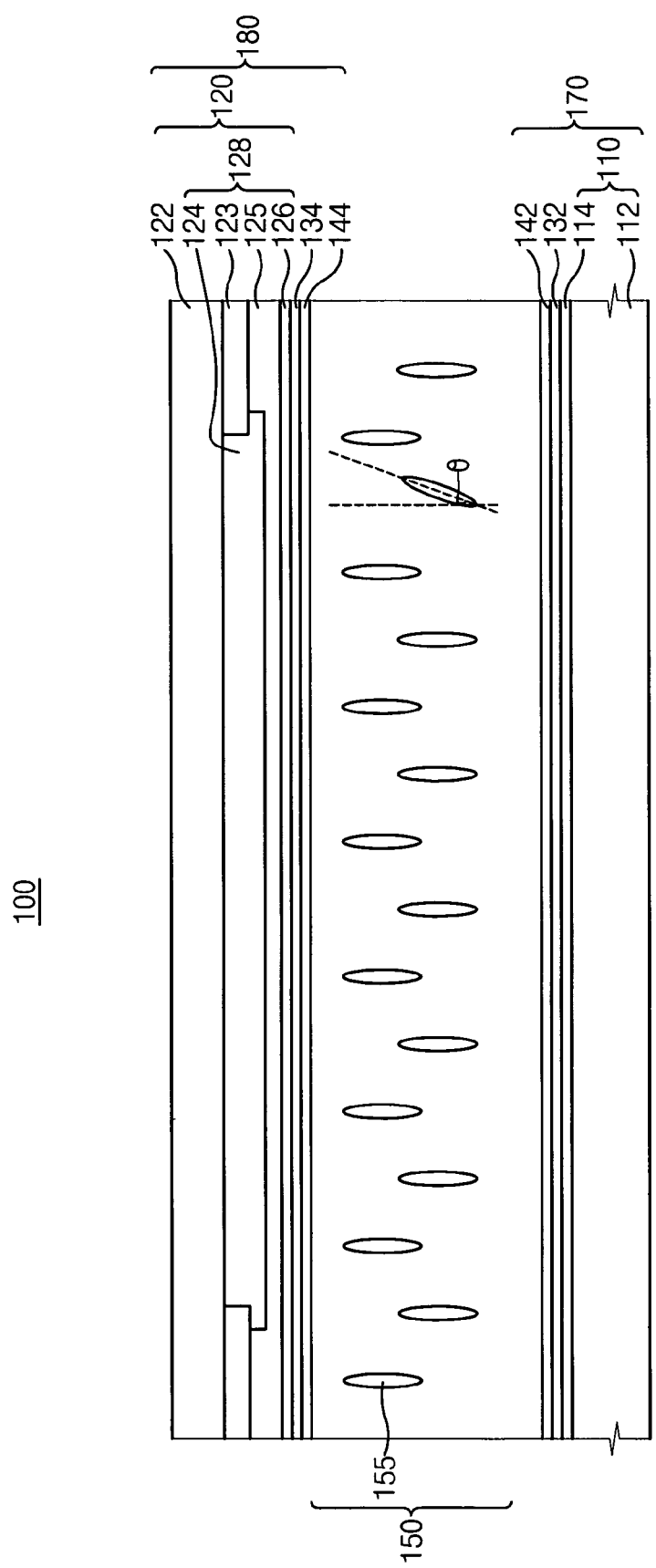
FIG. 1 is a cross-sectional view illustrating a pixel of a liquid crystal display panel in accordance with an exemplary embodiment of the present invention.

FIG. 1 is a cross-sectional view illustrating a pixel of a liquid crystal display panel in accordance with an exemplary embodiment of the present invention.

Referring to FIG. 1, a liquid crystal display panel 100 includes a first substrate 170, a second substrate 180 and a liquid crystal layer 150.

The first substrate 170 includes a lower substrate 110, a first buffer layer 132 formed on the lower substrate 110 and a first alignment layer 142 formed on the first buffer layer 132. The lower substrate 110 includes a first base substrate 112 including glass and a first pattern layer 114 formed on the first base substrate 112. The first pattern layer 114 includes a plurality of gate lines (not shown) and a plurality of data lines (not shown), a pixel electrode (not shown) and a thin film transistor (not shown). The gate lines and data lines cross each other, and are formed on the first base substrate 112. Each of the pixel electrodes is formed on a pixel area defined by the gate and data lines. The thin film transistor turns the pixel electrode on and off. The first buffer layer 132 is formed on the lower substrate 110. The first alignment layer 142 is formed on the first buffer layer 132, and the first alignment layer 142 makes contact with the liquid crystal layer 150.

The second substrate 180 includes an upper substrate 120, a second buffer layer 134 formed beneath the upper substrate 120 and a second alignment layer 144 formed beneath the buffer layer 134. The upper substrate 120 includes a second base substrate 122 including glass and a second pattern layer 128 formed beneath the second base substrate 122. The second pattern layer 128 includes a black matrix 123, a color filter 124, an insulating layer 125 and a common electrode 126. The black matrix 123 is formed beneath the second base substrate 122 in an area corresponding to the pixel area. The color filter 124 is formed between adjacent black matrices 123. The insulating layer 125 insulates and protects the black matrix 123 and the color filter 124. The common electrode 126 is formed beneath the insulating layer 125. The second buffer layer 134 is formed beneath the second pattern layer 128, and the second alignment layer 144 is formed beneath the second buffer layer 134.

In the present embodiment, the black matrix 123 is formed by partially etching a metal or a metal compound after the metal or the metal compound is deposited on the second base substrate 122. Examples of the metal may include chromium (Cr). The metal compound may include a chromium oxide (CrOx), a chromium nitride (CrNx), etc. Alternatively, the black matrix 123 may be formed on the second base substrate 122 by a photolithography process after an opaque material including a photoresist compound is coated on the second base substrate 122. Examples of the opaque material may include carbon black, a pigment mixture, a dye mixture, etc. The pigment mixture may include a red pigment, a green pigment and a blue pigment. The dye mixture may include red dye, a green dye and blue dye. Alternatively, a plurality of color filters 124 is overlapped to form the black matrix 123.

The color filter 124 is formed beneath the second base substrate 122 corresponding to the pixel area of the first substrate 170, so that the color filter 124 selectively transmits light having a predetermined wavelength. The color filter 124 includes a red color filter, a green color filter and a blue color filter. The color filter 124 may be formed using a color filter composition. The color filter composition may include a photo-polymerizable initiator, a monomer, a binder resin, a pigment, a solvent, the photoresist compound, etc. Alternatively, the color filter 124 may be formed on the lower substrate 110.

The pixel electrode (not shown) and the common electrode 126 may include conductive and transparent materials such as indium tin oxide (ITO), indium zinc oxide (IZO), tin oxide (TO) and zinc oxide (ZO), etc. Each of the pixel electrodes and the common electrode 126 may include a reflective electrode having excellent light reflectance. The pixel electrode and the common electrode 126 preferably include indium tin oxide (ITO) including tin or tin oxide in a range of about 5% by weight.

The liquid crystal layer 150 is disposed between the first substrate 170 and the second substrate 180. When an electric field is not applied to the liquid crystal layer 150, the liquid crystal molecules 155 are aligned along a direction substantially in perpendicular to each of surfaces of the first and second alignment layers 142 and 144. In other words, a longitudinal axis of the liquid crystal molecule 155 is arranged along the direction substantially in perpendicular to each of the surfaces of the first and second alignment layers 142 and 144. Also, the liquid crystal molecules 155 are aligned to be inclined by a pretilt angle ($\theta$) with respect to the direction substantially in perpendicular to each of the surfaces of the first and second alignment layers 142 and 144. The first and second alignment layers 142 and 144 may align the liquid crystal molecules 155 in a direction substantially in perpendicular to each of the surfaces of the first and second alignment layers 142 and 144 through chemical properties of the first and second alignment layers 142 and 144 without an additional process.

The first alignment layer 142 and the second alignment layer 144 include a diamond-like carbon (DLC) thin film containing fluorine (F). The diamond-like carbon (DLC) thin film containing fluorine is formed on the first buffer layer 132. The diamond-like carbon (DLC) thin film containing fluorine is also formed on the second buffer layer 134. The diamond-like carbon (DLC) is formed on the first and second buffer layers 132 and 134 by plasma enhanced chemical vapor deposition (PECVD) process. Particularly, a hydrocarbon gas as a source gas, helium or argon gas as an inert gas, and a carbon tetra fluoride ($CF_4$) gas are provided to perform the PECVD process.

The fluorine contained in the carbon tetra fluoride gas increases a contact angle at the surfaces of the first and second alignment layers 142 and 144, and thus hydrophobic properties also increase at the surfaces of the alignment layers 142 and 144. Therefore, a hydrophobic functional group that is contained in an end portion of the liquid crystal molecule 155 advances to the surface of the first and second alignment layers 142 and 144 to align the liquid crystal molecule 155 in the direction substantially perpendicular to each of the surfaces of the alignment layers 142 and 144. The pretilt angle ($\theta$) of the liquid crystal molecule 155 decreases when a content of the fluorine in the alignment layer increases. Table 1 shows the pretilt angle ($\theta$) and a contact angle when varying a content of carbon tetra fluoride.

TABLE 1

| $CF_4$ (sccm) | 5 | 10 | 20 | 30 |
|---|---|---|---|---|
| Pretilt angle (°) | 5 | 4 | 2 | 0.5 |
| Contact angle (°) | 85.8 | 108.9 | 105. | 105.7 |

The pretilt angle ($\theta$) of the liquid crystal molecule 155 may be adjusted by changing the content of fluorine contained in the alignment layer. The pretilt angle ($\theta$) also may be controlled by irradiating an ion beam to the liquid crystal molecule 155. When the pretilt angle ($\theta$) exceeds about 10°, a contrast ratio exceedingly decreases. Therefore, the pretilt angle ($\theta$) is in a range of about 0° to about 10°, and preferably in a range of about 5° to about 10°.

The diamond-like carbon (DLC) thin film may be formed by a chemical vapor deposition (CVD) method, an evaporation method or a sputtering method instead of the PECVD method.

The first buffer layer 132 includes a polymer-like carbon (PLC) thin film. The second buffer layer 134 also includes a polymer-like carbon (PLC) thin film. A carbon thin film is classified as either the diamond-like (DLC) carbon or the polymer-like carbon (PLC) based on a content of hydrogen in the carbon thin film. As the content of the hydrogen increases, the closer the carbon thin film is to the polymer-like carbon (PLC) thin film, and as the content of hydrogen decreases, the closer the carbon thin film is to the diamond-like carbon (DLC) thin film. Carbon contained in the polymer-like carbon (PLC) thin film may exist in the form of a hydro-carbon. The polymer-like carbon (PLC) thin film is amorphous. Hydrogen contained in the polymer-like carbon (PLC) thin film exists as a carbon-hydrogen bond (C—H) or hydrogen-hydrogen bond (H—H). In the present embodiment, the polymer-like carbon (PLC) thin film is defined as a carbon thin film containing hydrogen exceeding about 30% atomic percentage (at %). When the content of the hydrogen exceeds about 60 at %, a deposition speed exceeds an etching speed during a deposition process, so that the normal deposition process cannot be performed. Thus, the content of the hydrogen in the polymer-like carbon (PLC) thin film is in a range of about 30 at % to about 60 at %. The content of hydrogen in the polymer-like carbon (PLC) thin film is preferably in a range of about 40 at % to about 55 at %.

The polymer-like carbon (PLC) requires lower energy than diamond-like carbon (DLC) during the deposition process, so that the polymer-like carbon (PLC) thin film has a comparatively lower residual stress when compared to the diamond-like (DLC) carbon thin film. Therefore, a separation of the alignment layer from the buffer layer becomes more difficult, so that the adherent property of the alignment layer may be improved. In addition, the polymer-like carbon (PLC) thin film has a lower density when compared to the diamond-like carbon (DLC) thin film, so that an internal stress is lower when compared to the diamond-like carbon (DLC) thin film.

The polymer-like carbon (PLC) exhibits increased light transmittance characteristics, when compared to diamond-like carbon (DLC), in that an optical band gap energy of the polymer-like carbon (PLC) is greater than the optical band gap energy of the diamond-like carbon (DLC). The optical band gap energy of the polymer-like carbon (PLC) is high, so that visible light does not transfer an electron in the polymer-like carbon (PLC) thin film to an excited state. Thus, the visible light passes through the polymer-like carbon (PLC) thin film. In contrast, the optical band gap energy of the diamond-like carbon (DLC) is low, so that visible light may transfer the electron in the diamond-like carbon (DLC) thin film to the excited state. Thus, visible light is absorbed in the diamond-like carbon (DLC) thin film, thereby decreasing the light transmittance of the diamond-like carbon (DLC) thin film.

Figure 6:
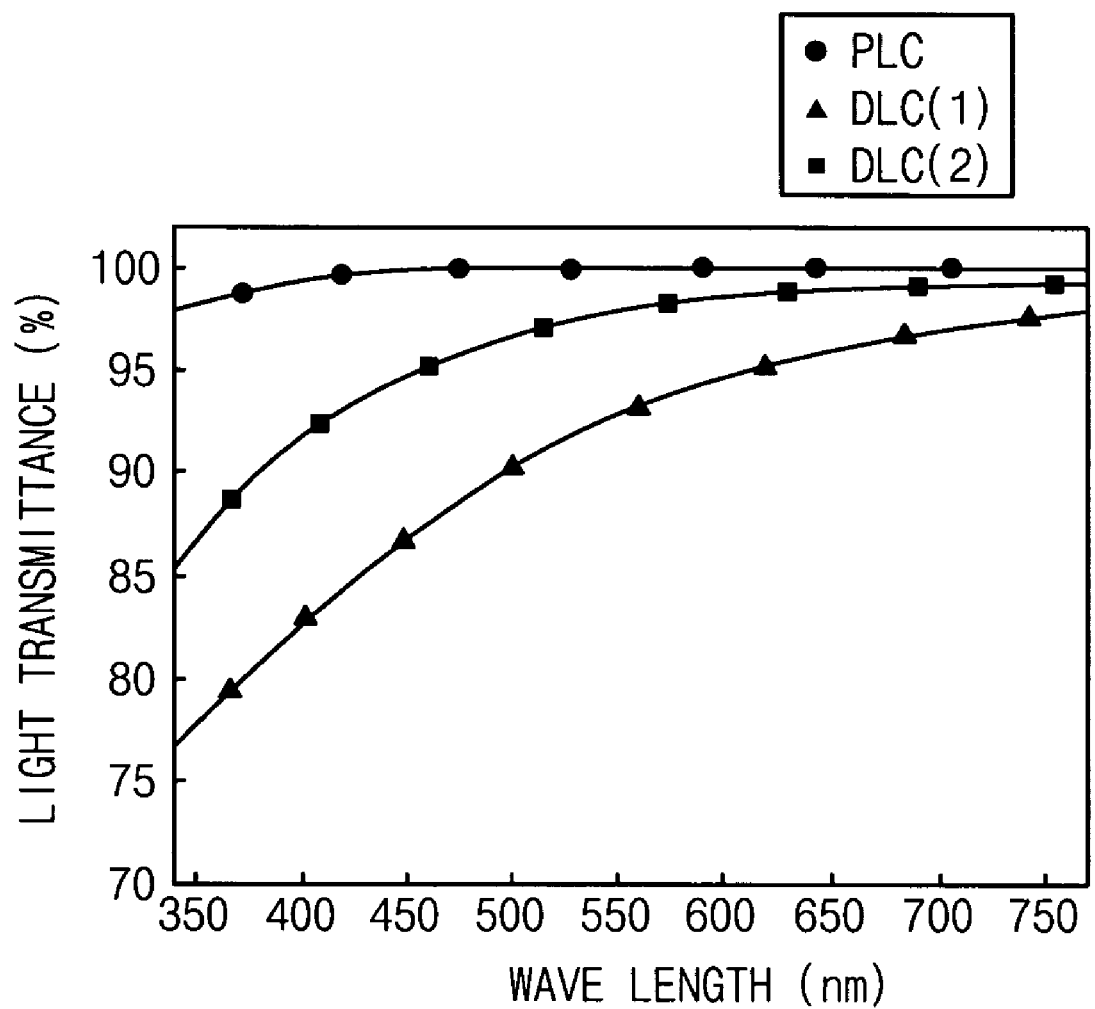
FIG. 6 is a graph showing light transmittances of polymer-like carbon (PLC) and diamond-like carbon (DLC) when varying a wavelength of light in accordance with an exemplary embodiment of the present invention.

FIG. 6 is a graph showing a light transmittance of a polymer-like carbon (PLC) and a diamond-like carbon (DLC) when varying a wavelength of light.

Referring to FIG. 6, the light transmittance of the polymer-like carbon (PLC) thin film was about 100% at a blue area (350 nm~400 nm) of the visible light. However, the light transmittance of the diamond-like carbon (DLC) thin films was sharply decreased at a blue area of the visible light. In FIG. 6, DLC (1) and DLC (2) represent diamond-like carbon (DLC) thin films. The DLC (1) had a greater band gap energy compared to the DLC (2). In the present embodiment, each of the first and second buffer layers 132 and 134 includes the polymer-like carbon (PLC) thin film, so that the first and second buffer layers 132 and 134 have optical properties such as increased light transmittance. Therefore, although the first and second buffer layers 132 and 134 are additionally formed on the lower and upper substrates 110 and 120, respectively, to enhance the adhering property of the first and second alignment layers 142 and 144, light transmittance of light passing through the first and second buffer layers 132 and 134 is not decreased.

When the band gap energy of the polymer-like carbon (PLC) thin film is less than about 2.0 eV, the light transmittance at the blue area of the visible light is remarkably lowered, and when the band gap energy of the polymer-like carbon (PLC) thin film exceeds 4.0 eV, hydrogen may be contained in the polymer-like carbon (PLC) thin film at increased levels. Therefore, the band gap energy of the polymer-like carbon (PLC) thin film is preferably in a range of about 2.0 eV to about 4.0 eV.

In addition, when the content of an $sp^3$ hybrid bonded carbon is less than about 40 at %, hydrogen in a saturated hydrocarbon is deviated from the saturated hydro-carbon to result in an $sp^2$ hybrid bonded carbon in the polymer-like carbon (PLC) thin film, thereby deteriorating the light transmittance. When the content of the $sp^3$ hybrid bonded carbon exceeds about 60 at %, the amount of the hydrogen in the polymer-like carbon (PLC) thin film increases to such a level that the first and second buffer layers 132 and 134 may be ineffective. Therefore, the content of the $sp^3$ hybrid bonded carbon is in a range of about 40 at % to about 60 at %, and preferably in a range of about 45 at % to about 55 at %.

When the thickness of the first and second alignment layers 142 and 144 is less than about 30 Å, the vertical alignment of the liquid crystal molecules 155 may not be performed. When the thickness of the first and second alignment layers 142 and 144 exceeds about 1000 Å, the light transmittance at a visible light area is deteriorated. Therefore, each of the first and second alignment layers 142 and 144 has a thickness of about 30 Å to about 100 Å.

Each of the first and second buffer layers 132 and 134 has a thickness of about 10 Å to about 500 Å. The thickness of each of the first and second buffer layers 132 and 134 is determined with respect to the light transmittance. In the range of about 10 Å to about 500 Å, the desired light transmittance of the visible light can be maintained at the above-described range of the optical band gap energy. The first and second buffer layers 132 and 134 allow for excellent light transmittance while maintaining slice thickness, thereby reducing manufacturing costs of the first and second buffer layers 132 and 134.

The first buffer layer 132 is formed on the pixel electrode (not shown), and the second buffer layer 134 is formed on the common electrode 126. Particularly, the polymer-like carbon (PLC) is deposited on the pixel electrode and the common electrode. The hydrocarbon gas is used for the source gas, and helium (He) gas or argon (Ar) gas is used for the inert gas. The hydrocarbon gas is deposited on the pixel electrode and the common electrode using plasma enhanced chemical vapor deposition (PECVD). During the depositing process, an electric source having high frequency is applied to the source gas as an energy source. Although the high frequency electric source applied to the source gas has a low energy, the polymer-like carbon (PLC) film may be easily formed. The energy of the high frequency electric source is in a range of about 1 W to about 30 W. When the energy of the high frequency electric source is less than 1 W, the polymer-like carbon (PLC) thin film may not be formed. When the energy of the high frequency electric source exceeds 30 W, the diamond-like carbon (DLC) thin film may be formed.

Figure 2:
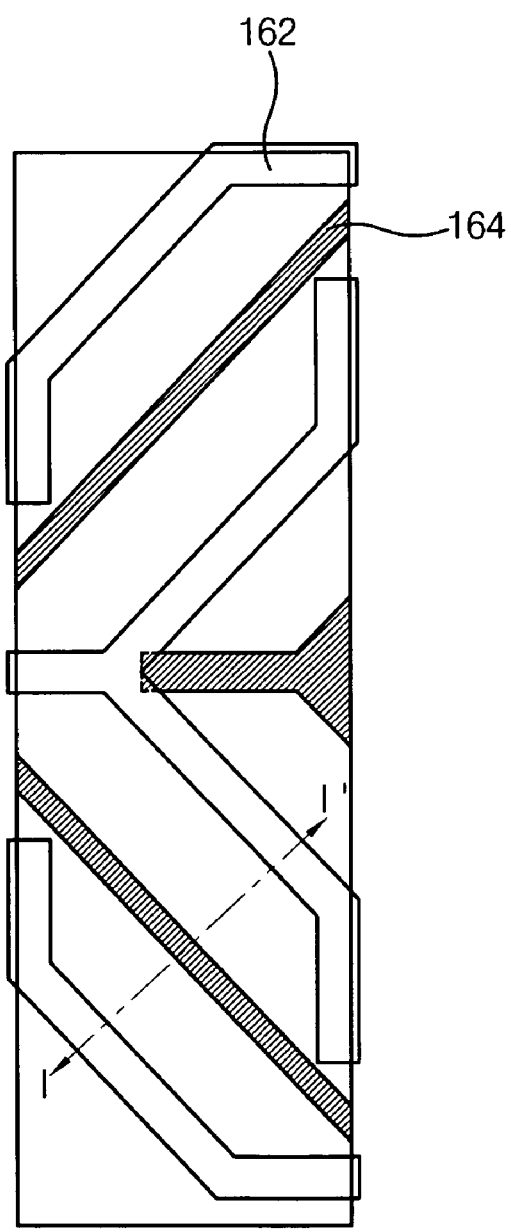
FIG. 2 is a plan view illustrating an opening pattern of a liquid crystal display panel in accordance with an exemplary embodiment of the present invention.
Figure 3:
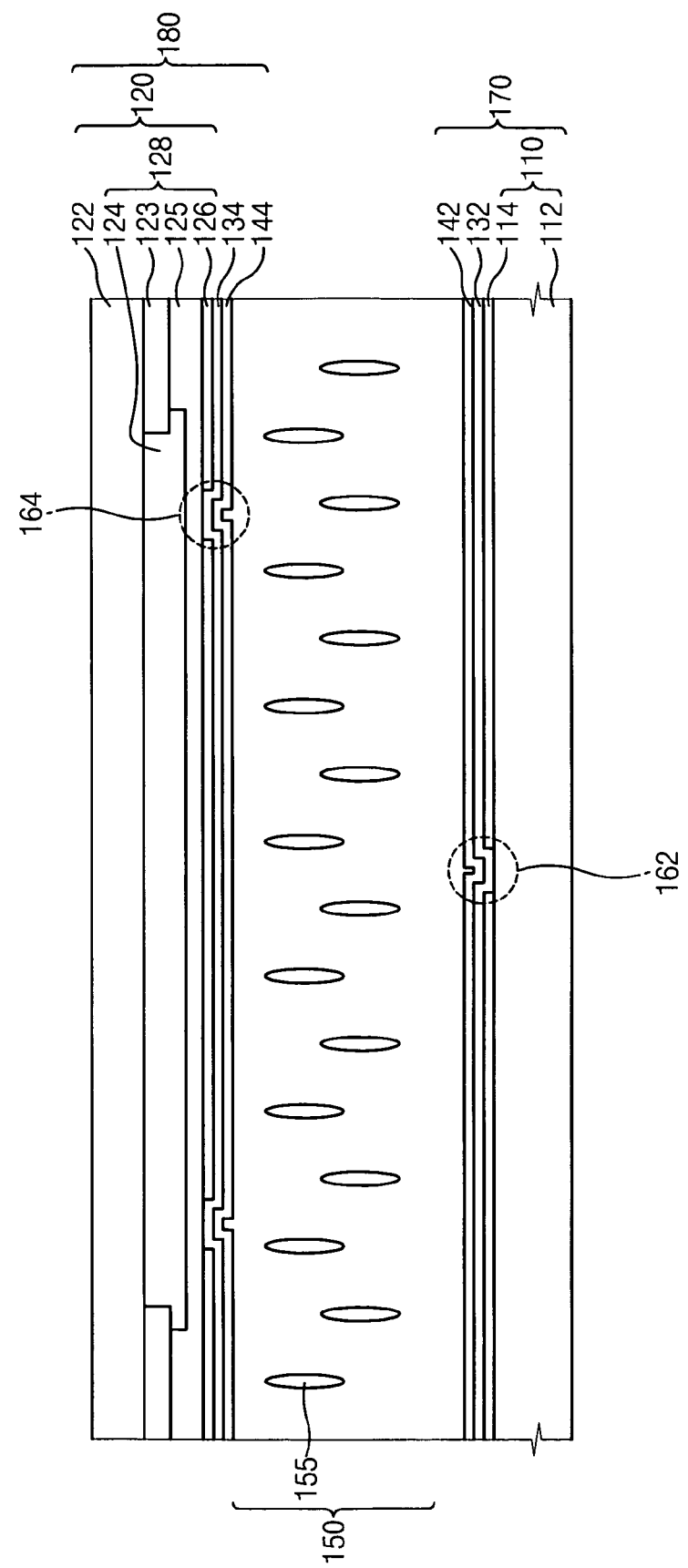
FIG. 3 is a cross sectional view taken along the line I-I' of FIG. 2.

FIG. 2 is a plan view illustrating an opening pattern of a liquid crystal display panel in accordance with an exemplary embodiment of the present invention. FIG. 3 is a cross sectional view taken along a line I-I' of FIG. 2.

In the present embodiment, a liquid crystal display panel has substantially the same function and structure as the liquid crystal display panel described in connection with FIG. 1 except for openings 162 and 164. Therefore, only different parts will be described herein. In the present embodiment, the same reference numerals will be used to refer to the same or like parts as those in FIG. 1 and any further repetitive descriptions will be omitted.

Referring to FIGS. 2 and 3, a first opening 162 and a second opening 164 are formed on lower and upper substrates 112 and 122, respectively. The first opening 162 is formed by partially removing a first alignment layer 142, and the second opening 164 is formed by partially removing a second alignment layer 144. When an electric filed is applied to a liquid crystal layer 150, fringe fields are formed around the first and second openings 162 and 164, respectively. The fringe field is defined as a curved electric field that is formed around the first and second openings 162 and 164. In the present embodiment, the liquid crystal molecules 155 have a negative anisotropic permittivity. A longitudinal axis of the liquid crystal molecule 155 is aligned in a direction substantially perpendicular to a direction of the electric field when the electric field is not applied to the liquid crystal layer 150. Thus, the longitudinal axis of the liquid crystal molecule 155 adjacent to the openings 162 and 164 is twisted with respect to each of surfaces of the first and second substrates 170 and 180. The first opening 162 and the second opening 164 are formed on the first and second substrates 170 and 180, respectively, so that the first opening 162 may not correspond to the second opening 164.

Referring to FIG. 2, the first opening 162 formed on the first substrate 170 has a slanted shape or a substantially V-shape when viewed on a plane. The second opening 164 formed on the second substrate 180 has a slanted shape when viewed on a plane.

Figure 4:
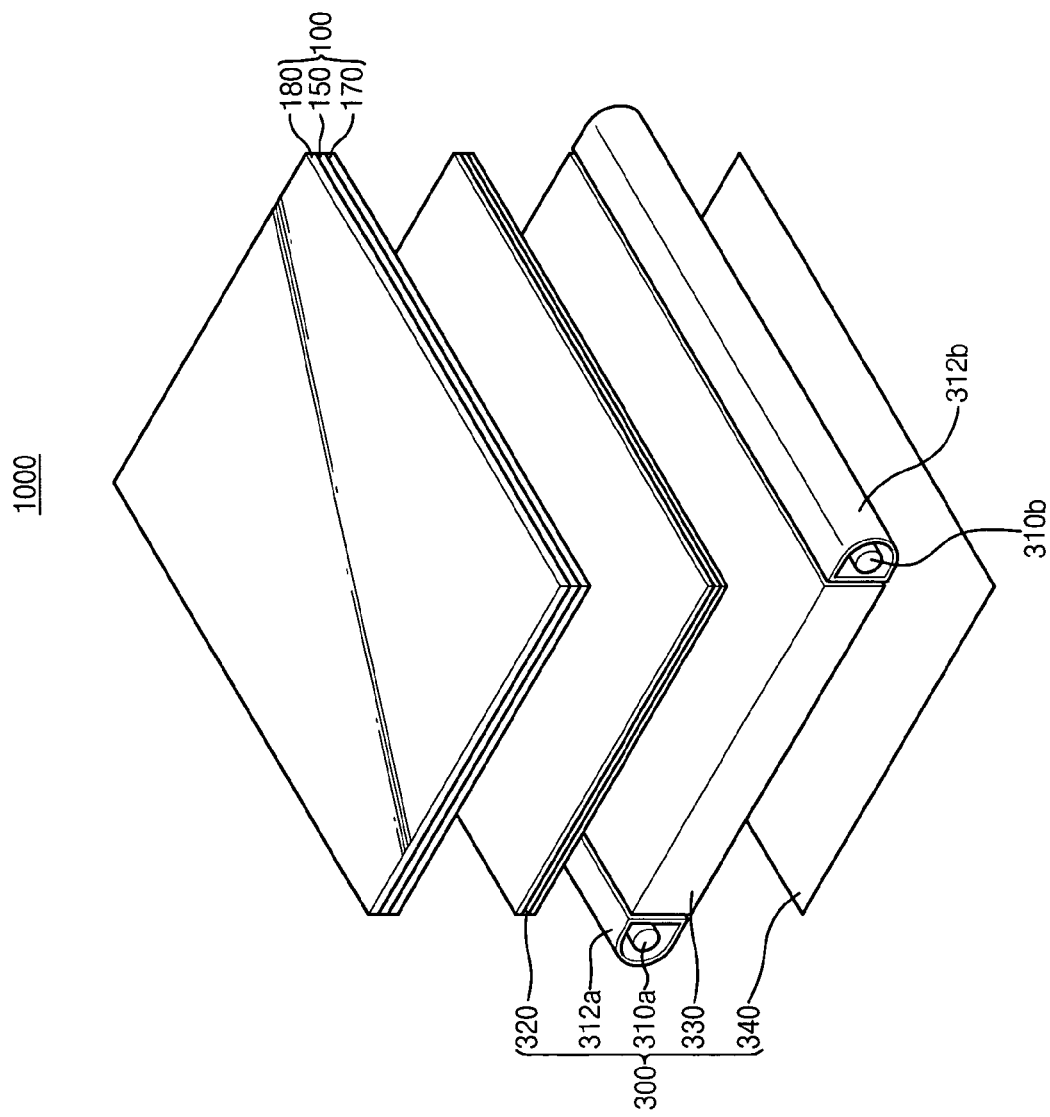
FIG. 4 is an exploded perspective view illustrating a liquid crystal display apparatus in accordance with an exemplary embodiment of the present invention.

FIG. 4 is an exploded perspective view illustrating a liquid crystal display apparatus in accordance with an exemplary embodiment of the present invention.

Referring to FIG. 4, a liquid crystal display apparatus 1000 includes a liquid crystal display panel 100 and a back light assembly 300.

The liquid crystal display panel 100 includes a first substrate 170, a second substrate 180 and a liquid crystal layer 150. The liquid crystal display panel 100 has been described in connection with FIG. 1, and thus a further description of the liquid crystal display panel 100 will be omitted.

The back light assembly 300 includes a reflective plate 340, a first lamp 310*a*, a first lamp cover 312*a*, a second lamp 310*b*, a second lamp cover 312*b*, a light guide plate 330 and an optical sheet 320.

The first and second lamps 310*a* and 310*b* generate light. The first and second lamps 310*a* and 310*b* may include a cold cathode fluorescent lamp (CCFL), a light emitting diode (LED), etc. The first and second lamp covers 312*a* and 312*b* protect the first and second lamps 310*a* and 310*b*, respectively. Also, each of the first and second lamps 310*a* and 310*b* reflects light to the light guide plate 330. The light guide plate 330 converts light generated from the first and second lamps 310*a* and 310*b* into planar light, and provides the planar light toward an optical sheet 320. The light guide plate 330 may include polymethylmethacrylate (PMMA). The reflective plate 340 is disposed under the light guide plate 330, and reflects the leaked light from the light guide plate 330 toward the light guide plate 330. The optical sheet 320 uniformizes brightness of the light provided from the light guide plate 330, and provides light having substantially uniform brightness toward the liquid crystal display panel 100.

A polarizing film (not shown) and a phase delay film (not shown) may be disposed between the liquid crystal display panel 100 and the back light assembly 300. In addition, the polarizing film and the phase delay film may be disposed on the liquid crystal display panel 100.

Figure 5:
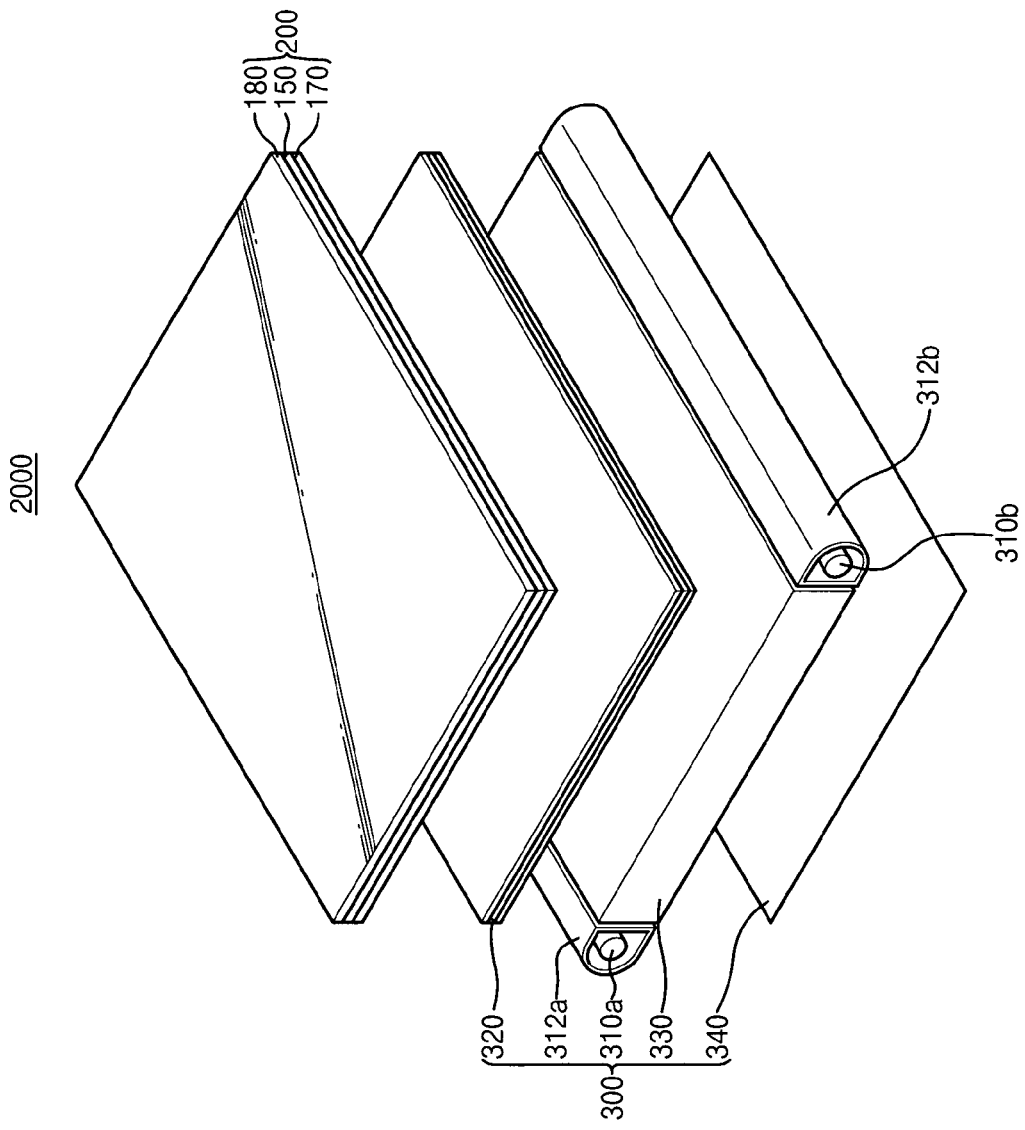
FIG. 5 is an exploded perspective view illustrating a liquid crystal display apparatus in accordance with an exemplary embodiment of the present invention.

FIG. 5 is an exploded perspective view illustrating a liquid crystal display apparatus in accordance with an exemplary embodiment of the present invention Referring to FIG. 5, a liquid crystal display apparatus 2000 includes a liquid crystal display panel 200 and a back light assembly 300. The liquid crystal display apparatus 2000 has substantially the same function and structure as the liquid crystal display apparatus 1000 described in connection with FIG. 4 except for the liquid crystal display panel 200. The liquid crystal display panel 200 has been described in connection with FIGS. 2 and 3, and thus a further description of the liquid crystal display panel 200 and liquid crystal display apparatus 2000 will be omitted.

The liquid crystal display panel and the liquid crystal display apparatus according to embodiments of the present invention include a diamond-like carbon (DLC) thin film containing fluorine as a non-contact typed inorganic alignment layer, so that a vertical alignment of the liquid crystal may be performed by only chemical property of the alignment layer without an additional process. Particularly, the alignment layer according to embodiments of the present invention is effectively applied in the PVA mode.

In addition, the liquid crystal display panel according to the present invention includes the buffer layer including the polymer-like carbon thin-film (PLC) and the alignment layer including diamond-like carbon thin film (DLC) containing fluorine, thereby improving adhering characteristics of the alignment layer and preventing the alignment layer from being separated from the substrate to improve stability of the alignment layer. Further, the buffer layer has an enhanced light transmittance at a visible light area, thereby preventing light transmittance from being lowered.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A liquid crystal display panel comprising:
   (i) a first substrate comprising:
      a lower substrate;
      a first buffer layer formed on the lower substrate, the first buffer layer comprising a polymer-like carbon thin film; and
      a first alignment layer formed on the first buffer layer, the first alignment layer comprising a diamond-like carbon thin film containing fluorine;
   (ii) a second substrate opposite the first substrate, comprising:
      an upper substrate;
      a second buffer layer formed on the upper substrate, the second buffer layer comprising the polymer-like carbon thin film; and
      a second alignment layer formed on the second buffer layer, the second alignment layer comprising the diamond-like carbon thin film containing fluorine; and
   (iii) a liquid crystal layer disposed between the first and second substrates, the liquid crystal layer comprising liquid crystal molecules having a pretilt angle.

2. The liquid crystal display panel of claim 1, wherein the polymer-like carbon thin film comprises hydrogen in a range of about 30% atomic percentage (at %) to about 60% atomic percentage (at %).

3. The liquid crystal display panel of claim 2, wherein the hydrogen is bonded to carbon (C—H) or hydrogen (H—H).

4. The liquid crystal display panel of claim 1, wherein the polymer-like carbon thin film comprises an $sp^3$ hybrid bonded carbon in a range of about 40% atomic percentage (at %) to about 60% atomic percentage (at %) based on a total number of carbons in the polymer-like carbon thin film.

5. The liquid crystal display panel of claim 1, wherein each of the first and second buffer layers has a band gap energy of about 2.0 to about 4.0 eV.

6. The liquid crystal display panel of claim 1, wherein the first and second alignment layers, and the first and second buffer layers are deposited by plasma enhanced chemical vapor deposition (PECVD).

7. The liquid crystal display panel of claim 1, wherein the pretilt angle is formed between a longitudinal axis of a liquid crystal molecule and a direction substantially perpendicular to each of the first and second alignment layers.

8. The liquid crystal display panel of claim 7, wherein the pretilt angle decreases when an amount of the fluorine contained in the diamond-like carbon thin film increases.

9. The liquid crystal display panel of claim 7, wherein the pretilt angle is in a range of about 0° to about 10°.

10. The liquid crystal display panel of claim 1, wherein a thickness of each of the first and second alignment layers is in a range of about 30 Å to about 1000 Å.

11. The liquid crystal display panel of claim 1, wherein a thickness of each of the first and second buffer layers is in a range of about 10 Å to about 500 Å.

12. The liquid crystal display panel of claim 1, wherein the lower substrate comprises:
   a first base substrate; and
   a first pattern layer comprising:
      a plurality of gate lines and data lines crossed with each other and formed on the first base substrate;
      a pixel electrode corresponding to each pixel area defined by the gate lines and data lines; and
      a plurality of thin film transistors for respectively switching each pixel electrode.

13. The liquid crystal display panel of claim 12, wherein the upper substrate comprises:
   a second base substrate; and
   a second pattern layer comprising:
      a black matrix formed on the second base substrate, the black matrix defining an area corresponding to a pixel area;
      a color filter disposed between adjacent black matrices;
      an insulating layer to insulate the black matrix and the color filter; and
      a common electrode formed on the insulating layer.

14. The liquid crystal display panel of claim 12, wherein the pixel electrode comprises indium tin oxide (ITO).

15. The liquid crystal display panel of claim 13, wherein a pixel electrode includes a first opening, the common electrode includes a second opening, and the first and second openings divide an electric field applied to the liquid crystal layer into a plurality of micro domains.

16. A liquid crystal display apparatus comprising:
(i) a first substrate comprising:
   a lower substrate;
   a first buffer layer formed on the lower substrate, the first buffer layer comprising a polymer-like carbon thin film; and
   a first alignment layer formed on the first buffer layer, the first alignment layer comprising a diamond-like carbon thin film containing fluorine;
(ii) a second substrate opposite the first substrate, comprising:
   an upper substrate;
   a second buffer layer formed on the upper substrate, the second buffer layer comprising the polymer-like carbon thin film; and
   a second alignment layer formed on the second buffer layer, the second alignment layer comprising the diamond-like carbon thin film containing fluorine;
(iii) a liquid crystal layer disposed between the first and second substrates, the liquid crystal layer comprising liquid crystal molecules having a pretilt angle; and
(iv) a back light assembly to provide the liquid crystal layer with light.

17. The liquid crystal display apparatus of claim 16, wherein the lower substrate comprises:
   a first base substrate; and
   a first pattern layer comprising:
      a plurality of gate lines and data lines crossed with each other and formed on the first base substrate;
      a pixel electrode corresponding to each pixel area defined by the gate lines and data lines; and
      a plurality of thin film transistors for respectively turning on or off each pixel electrode.

18. The liquid crystal display apparatus of claim 16, wherein the upper substrate comprises:
   a second base substrate; and
   a second pattern layer comprising:
      a black matrix formed on the second base substrate, the black matrix defining an area corresponding to a pixel area;
      a color filter disposed between adjacent black matrices;
      an insulating layer to insulate the black matrix and the color filter; and
      a common electrode formed on the insulating layer.

19. The liquid crystal display apparatus of claim 16, wherein the polymer-like carbon thin film comprises an $sp^3$ hybrid bonded carbon in a range of about 40% atomic percentage (at %) to about 60% atomic percentage (at %) based on a total number of carbons in the polymer-like carbon thin film.

20. The liquid crystal display apparatus of claim 16, wherein each of the first and second buffer layers has a band gap energy of about 2.0 to about 4.0 eV.

21. The liquid crystal display apparatus of claim 17, wherein a pixel electrode includes a first opening, the common electrode includes a second opening, and the first and second openings divide an electric field applied to the liquid crystal layer into a plurality of micro domains when viewed on a plane.

* * * * *